United States Patent [19]
Hubbs et al.

[11] Patent Number: 5,746,546
[45] Date of Patent: May 5, 1998

[54] SOIL STABILIZATION COMPOSITION AND METHOD

[75] Inventors: Jonathan W. Hubbs; James J. Hubbs, Jr., both of Phoenix, Ariz.

[73] Assignee: Stabilizer, Inc., Phoenix, Ariz.

[21] Appl. No.: 590,774

[22] Filed: Jan. 24, 1996

[51] Int. Cl.$^6$ ............................................. E02D 3/12
[52] U.S. Cl. .................. 405/263; 47/9; 405/258
[58] Field of Search .................... 405/258, 263, 405/264, 24, 32; 47/9, 58

[56] References Cited

U.S. PATENT DOCUMENTS

| | | | |
|---|---|---|---|
| 2,957,834 | 10/1960 | Moller et al. | 523/132 |
| 3,303,609 | 2/1967 | MacHenry | 47/9 |
| 3,696,559 | 10/1972 | Hatton | 47/9 |
| 3,948,830 | 4/1976 | Donnelly et al. | 523/401 |
| 4,268,551 | 5/1981 | Moore | 428/17 |
| 4,285,748 | 8/1981 | Booker et al. | 156/167 |
| 4,521,452 | 6/1985 | Highsmith | 427/136 |
| 4,818,585 | 4/1989 | Shipp | 47/9 X |
| 4,819,933 | 4/1989 | Armond | |
| 4,827,665 | 5/1989 | Hubbs et al. | 47/58 |
| 4,867,613 | 9/1989 | McLeod et al. | 405/263 |
| 4,867,614 | 9/1989 | Freed | |
| 4,916,855 | 4/1990 | Halliday et al. | |
| 4,936,711 | 6/1990 | Sasahara | 405/263 |
| 5,007,766 | 4/1991 | Freed et al. | 405/32 X |
| 5,207,826 | 5/1993 | Westland et al. | 106/163.1 |
| 5,588,783 | 12/1996 | Brabston et al. | 405/258 |

Primary Examiner—Dennis L. Taylor
Attorney, Agent, or Firm—William R. Bachand; Michael A. Lechter

[57] ABSTRACT

A product for forming a stable resilient surface layer which comprises a particulate aggregate having particles of a plurality of sizes and including fiber strands and a selected amount of water-absorbent, water-activated adhesive particles having a swell volume when absorbing water in a range of 25% to 45%. When subjected to sufficient water the water-absorbent particles swell and bind the aggregate and fiber strands forming a high shear strength, flexible resilient layer.

85 Claims, 1 Drawing Sheet

5,746,546

1

SOIL STABILIZATION COMPOSITION AND METHOD

BACKGROUND

The present invention relates to stabilizing soil, and particularly, to creating a resilient and flexible bound surface with relatively high load bearing shear strength which manifests particularly favorable water absorption and release characteristics. The present invention finds specific utility in stabilizing golf bunkers to prevent distortion and disfiguration of the bunker's shape, and contamination of the sand contained in the bunker, and in various athletic fields and recreational and landscape surfaces.

For example, sand bunkers in golf courses are, in general, pits designed to have specific peripheral configurations (contour), a specific depth and sides at a predetermined angle. The bunkers usually are designed to contain approximately 4–6 inches of sand on the bottom of the pit, tapering to a thickness of 2 inches on the sides and typically surrounded by sod extending over the edge of the sides by approximately one inch. Generally, some form of drainage system, typically a perforated pipe in a gravel filled trench, is provided in the subgrade under the sand. Preferably, the sand includes a slightly damp underlayer, with a drier, "fluffed" upper layer to provide desirable playing characteristics for golfers. This is generally maintained using the standard golf course watering system, and "fluffing" the surface of the trap on a daily basis using a mechanized rake such as a "Sand Pro." Sand traps, however, tend to be subject to disfigurement and contamination of the sand. For example, normal usage and the elements tend to cause the sand to retreat from the sidewalls of the bunker, particularly if the sidewalls are relatively steep, and to cause mixing of the sand with subsurface materials. Once the sidewalls are exposed, they are subject to erosion. The erosion tends to disfigure the contours of the bunkers, typically enlarging the periphery of the bunker, and decreasing the angle of the sidewalls. Changes in wall angle tend to affect the difficulty factor of the bunker. In addition, the erosion tends to introduce contaminants into, and discolor, the sand.

The enlargement problem tends to be exacerbated in practice by maintenance workers trimming the grass surrounding the bunker. No clear delineation is provided to the worker, and often the grass is trimmed back excessively, exposing still more area to erosion.

The contamination of the sand in the bunker tends to create a number of problems. In addition to aesthetics, contaminants tend to change the consistency and "play" of the sand in the bunker. More importantly, to the extent the contaminants are rocks and sizable gravel contaminating the sand, there is risk of injury to players and damage to golfing equipment. Further, silt and clay contaminating the sand, in addition to discoloring, tend over time to clog the drainage system, requiring costly maintenance and repair.

A number of attempts have been made to overcome the disfigurement and contamination problems. For example, historically, the bunker would be lined with a layer of native clay to retain the sand in the bunker, and reduce contamination. However, clay linings are susceptible to erosion, particularly if subjected to significant rainfall or watering. In addition, because the clay is formed of extremely fine particles, the drainage systems in clay lined bunkers are particularly susceptible to clogging, requiring relatively frequent repair.

Attempts have been made to strengthen clay liners by adding Portland cement to the clay. However, the clay cement linings tend to quickly deteriorate under the stresses created by the automated raking machinery; the weight of the machinery tends to crack and break up the liner, making it particularly susceptible to erosion. In addition, sizable pieces of hardened clay-cement mix tended to contaminate the sand in the bunker, creating a risk of physical injuries to the players, and damage to equipment.

Other attempts to prevent disfiguration and contamination have involved the use of geotextile fabric blankets as bunker liners. After the bunker pit is dug out, the geotextile blanket is laid, and stapled to the sidewalls about the perimeter of the pit. The staples are metal, u-shaped with legs on the order of six inches in length. In theory, the edges of the blanket extend under the sod about the perimeter of the bunker. Geotextiles blankets, however, are disadvantageous in a number of respects. The geotextile material tends to be relatively smooth, and does not retain sand on the sidewalls; the sand tends to flow off of the vertical sidewalls, particularly when subjected to heavy traffic, rainfall or watering. In addition, relatively fine particles (clay and silt "fines") from the subgrade underlying the blanket tend to bleed through the geotextile, and contaminate the sand. Contamination of the sand with the "fines" tends to cause the sand to pack, affecting the playability of the bunker. Further, the geotextile blanket is susceptible to being pulled up. For example, when the sidewalls are subjected to pressure, such as, for example, when stepped upon by a player, the staples have a tendency to work loose. Ultimately the membrane tends to retract from the sidewall, exposing the subgrade and sidewalls to the elements and erosion. Moreover, once exposed, such as, for example, on the sidewalls, or after being pulled up, the blanket is particularly susceptible to puncture by players and snagging on the automated raking machines. Once significantly damaged, the geotextile liner typically must be replaced, requiring costly and labor intensive removal of the sand. The staples are likewise susceptible to snagging, and can present a danger to players and maintenance workers.

More recently, the present inventors have used a mixture of soil and a water absorbing adhesive, such as psyllium, to create a subgrade barrier in a bunker. In general, the use of psyllium as a soil conditioner for stabilizing and enhancing water absorption and retention characteristics of the soil in athletic fields is known, described in U.S. Pat. No. 4,827,665, issued on May 9, 1989 to the present inventors. The use of a psyllium conditioner barrier layer was superior to the earlier attempts to prevent bunker disfigurement and sand contamination, but still had certain shortcomings. More particularly, unless relatively large gravel, e.g., larger than one eighth inch, was present in the soil mixed with the psyllium, the subgrade barrier did not provide load bearing strength sufficient to accommodate the typical equipment; the automatic raking equipment tended to crack the barrier. In addition, unless relatively large gravel was present, the subgrade barrier tended to crack and shrink when it dried, thus making it susceptible to erosion and breakage.

It is also, in general, known to add fiber to soil to increase the resistance of the soil to punching shear and reduce the compressibility of soil. Examples are described in U.S. Pat. Nos. 4,819,933 issued on Apr. 11, 1989 to V.J. Armond and 4,867,614 issued to W.W. Freed on Sep. 19, 1989.

Moreover, the present inventors have also employed a mixture of washed sand, psyllium, and fiber as a loose unbound surface for an equestrian arena with advantageous shock absorbing and cushioning characteristics.

SUMMARY OF THE INVENTION

The present invention relates to stabilizing soil, and particularly, to creating a resilient and flexible bound surface with relatively high load bearing shear strength which manifests particularly favorable water absorption and release characteristics. The present invention provides a golf bunker employing a particularly advantageous subgrade barrier layer formed by the mixing predetermined portions of a water absorbent adhesive, such as psyllium, and fiber strands of predetermined length with an aggregate having particles of a plurality of sizes, ranging downward from a predetermined maximum size (e.g., 2 mm). This results in a particularly strong, flexible, and resilient subgrade barrier which avoids the problems of the prior art, and additionally, has particularly advantageous water absorption and dispersal characteristics, without use of undesirably large rock particles.

BRIEF DESCRIPTION OF THE DRAWING

The preferred exemplary embodiment of the present invention is described in conjunction with the appended drawing, wherein.

Figure 1:
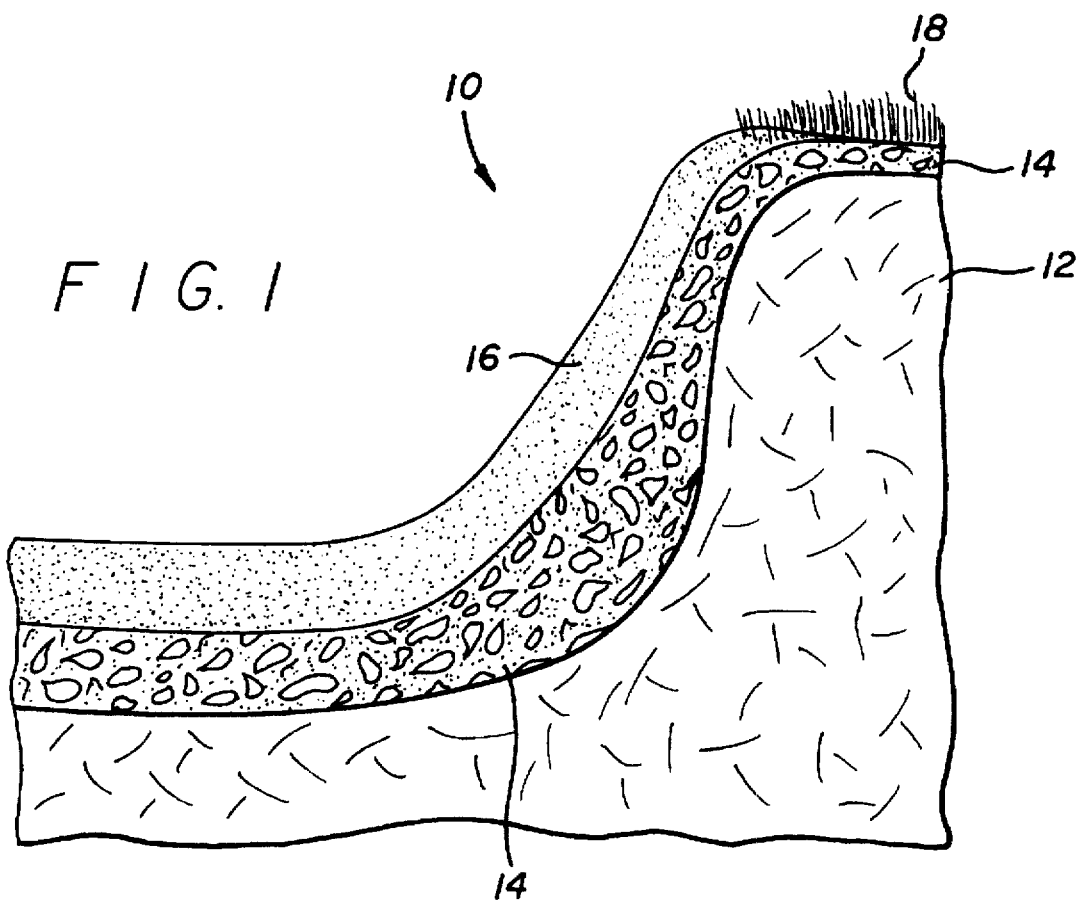
FIG. 1 is a partial, schematic sectional of a golf bunker including a subgrade barrier in accordance with the present invention.

DETAILED DESCRIPTION OF THE PREFERRED EXEMPLARY EMBODIMENT:

Referring now to FIG. 1, a golf bunker 10 in accordance with the present invention comprises a pit dug into the native earth 12 having a predetermined peripheral configuration, a predetermined depth, and sidewalls at a predetermined angle, a subgrade barrier layer 14, and a layer of sand 16. Bunker 10 is suitably surrounded by sod 18. In accordance with the present invention, subgrade barrier layer 14 is formed of a particulate (e.g., sand and clay) aggregate mixed with a water absorbent adhesive such as psyllium, and fiber strands of predetermined length. The aggregate preferably comprises angular particles of a plurality of sizes, ranging downward from a predetermined maximum size (e.g., 2 mm) chosen to assure that no particles of potentially harmful size are present to contaminate the sand. The combination of fibers and water absorbent adhesive (em, psyllium) provides unexpected load bearing and shearing strength, as well as elasticity and flexibility. Moreover, the fiber provides a wicking effect that permits water to be transported to the adhesive ( psyllium) mixed within the aggregate during installation so that the adhesive quickly absorbs its capacity of water, and thus activates, and excess water passes through subgrade barrier 14. Moreover, the use of barrier 14 tends to retain sand 16 on the sidewalls.

Figure 2:
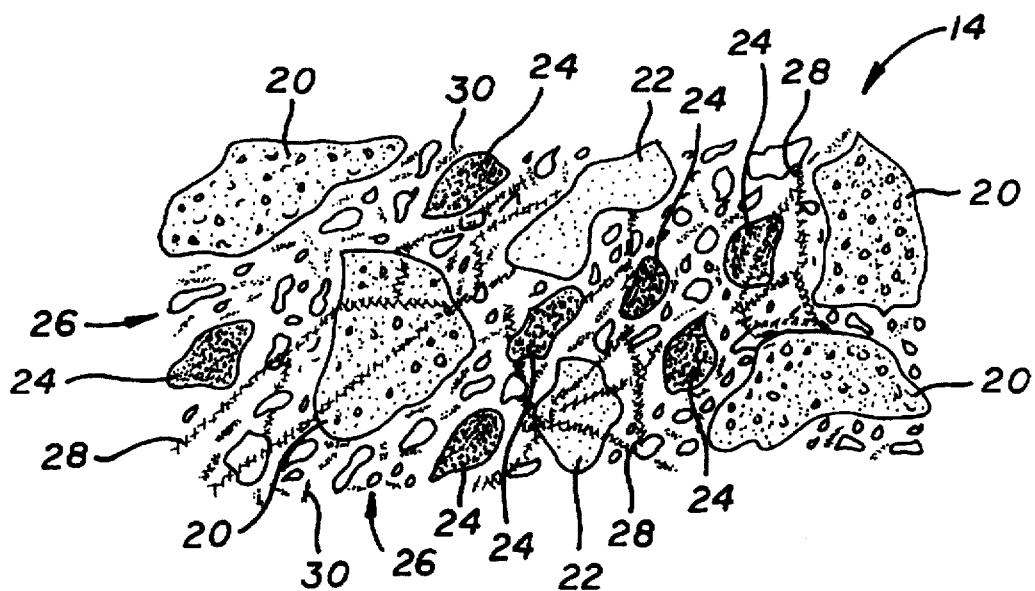
FIG. 2 is an enlarged detailed sectional of the sub barrier of FIG. 1, schematically illustrating the constituent components of the barrier layer.

More particularly, with reference to FIG. 2, subgrade barrier layer 14 comprises, in predetermined proportion, an aggregate of fine gravel/very coarse sand 20 (e.g., particle size of approximately 2 mm); coarse sand 22 (particles of from about 0.5 to 2 mm); fine sand 24 (e.g., particles in the range of 0.05 to 0.5 mm); and silt and clay 26 (particles from 0.0002 to 0.05 mm); discrete fibers 28; and a water absorbent adhesive 30, such as psyllium. The aggregate preferably includes no particles more than a predetermined maximum size, e.g., two millimeters in diameter. The aggregate suitably includes: 1–6% by volume of particles (gravel/very coarse sand) of the maximum size 20%–50% coarse sand; 20%–50% fine sand; and 10%–40% silt and clay. Preferably, the aggregate includes 1%–3% gravel (e.g., 2 mm); 30%–45% course sand; 25%–45% fine sand; and 15%–30% silt and clay. Ideally, the aggregate includes approximately 1.3% gravel (es, 2 mm), 38.2% coarse sand, 36.3% fine sand, and 24.2% silt and clay.

Such aggregates are particularly advantageous in that they do not include any rock particles that are sufficiently large to cause injury or damage to the players or equipment under normal circumstances.

Fiber strands 28 may be formed of any material that is relatively inert, and impervious to water, salts, acids, and fertilizers in the soil. A suitable material is polypropylene. Fiber strands 28 are preferably flat, ribbon-like, fibrillated fiber having a denier of at least 360 and most preferably in the range of 360 to 1000. However, monofilament fibers can also be used. Fibers 28 are suitably of a length chosen to provide adequate tensile strength to barrier layer 14, but not so long as to be subject to balling or present difficulties in mechanical application. The longer the fiber, the more tensile strength provided in the subgrade barrier, however, the longer fibers are not amenable to mechanical application, and are difficult to mix uniformly within the aggregate. Fiber strands 28 are suitably in the range of one-eight inch to three inches, typically in the range of one-eighth inch to two inches, preferably in the range of one-eighth inch to one-half inch and most preferably, one-quarter inch. For blown application, fibers with lengths in the range of one-eighth inch to three-quarters inch, and particularly one-quarter inch to one-half inch, are preferred. Fibrillated (multi-strand) fiber quarter-inch length, and 360 denier (approximately one-eighth inch wide) is preferred. During the mixing process, as will be explained, the fibrillated fibers, in effect, open up to present a spread net structure.

As noted above, barrier layer 14 includes a predetermined proportion of fiber 28. More particularly, barrier layer 14 includes on the order of 0.05 to 1.0 percent by dry weight of fiber 28, and preferably 0.1 percent (i.e., two pounds per U.S. ton). The amount of fiber 28 is chosen to provide desired strength, and flexibility, and additionally, to provide desirable water distribution characteristics in the subgrade barrier. The amount of fiber necessary for strength, tends to be inversely proportional to the amount of larger sized particles in the aggregate, and concomitantly, directly proportional to the amount of silt and clay. If too little fiber is included, the subgrade barrier tends to become too hard, and inflexible and subject to breakage under the stresses created by maintenance machinery. On the other hand, if too much fiber is included, the subgrade barrier becomes too soft, and does not provide sufficient tensile and sheer strength to support the maintenance machinery. In addition, the amount of fiber 28 included tends to affect the wicking action that transmits water to adhesive 30 (e.g. psyllium); if too much fiber 28 is included, the water is conducted quickly through subgrade barrier 14, rather than being absorbed by adhesive 30, in fact increasing the time necessary for the adhesive, e.g., psyllium, to absorb its capacity in water and activate.

As previously noted, water absorbent adhesive 30 preferably comprises psyllium (ground plantago). Adhesive 30 suitably exhibits a swell volume (an increase in volume when it has absorbed its capacity in water) in the range of 25%–45% and preferably about 35%. Psyllium is a particularly advantageous water absorbent adhesive, in that it is nontoxic and organic. Other water absorbent adhesives, however, may be utilized.

As previously noted, adhesive 30 ( psyllium), is included in predetermined proportion in the aggregate. More specifically, adhesive 30 is added in the amount of 0.10–2.0% by dry weight and preferably 0.5% (10 pounds per U.S. ton), where the adhesive has a 35% swell volume. If adhesive of a lower swell volume is utilized, the amount included in the aggregate is suitably concomitantly increased. Water absorbent adhesive 30 (em. psyllium) forms a glue-like substance when activated by water (when it absorbs its capacity of water), which adheres to the smaller particles in the aggregate, and binds the particles together. The amount of adhesive 30 included is chosen to provide the desired binding of the aggregate particles, while still permitting percolation of water through the subgrade barrier.

Barrier layer 14 can be formed in the bunker 10 in a number of ways. If the native earth has a suitable aggregate mix, or can readily be modified to bring it into the suitable ranges (e.g., all particles larger than the predetermined maximum size, e., 2 mm removed, and/or particles added to attain the appropriate percentages of the various sized particles), fibers 28 and adhesive 30 can be added to the aggregate in situ, by, for example, spreading the fibers and adhesive over the surface of the pit, then mixing, e.g., rototilling, the fibers and psyllium into the surface (and sides) of the pit to a depth of approximately one and one-half to six inches, preferably approximately two inches. The area is then soaked with water until the adhesive has absorbed to its capacity, and is thus activated. It is also important to activate all of adhesive 30, throughout barrier layer 14 with water. The adhesive is not activated to perform the binding function until it absorbs at least a certain percentage of its capacity of water, and does not provide maximum binding until it absorbs its capacity of water. It is therefore desirable to ensure that sufficient water reaches adhesive 30 throughout the barrier. Accordingly, care should be taken to ensure that water reaches the entirety of the mixture, particularly where the mixture is applied dry and subsequently watered. The mix can be raked and shaped either before or after wetting, and compacted with, e.g., rollers and/or hand tampers. Alternatively, the aggregate can be premixed and manually "plastered" onto the surface and/or walls. For example, premixed material can be disposed wet or dry on the bottom surface of the pit, and applied wet (spread or plastered) onto the sidewalls. In any event, it is desirable that the aggregate be relatively homogenous, and that fibers 28 and adhesive 30 be relatively uniformly mixed throughout.

It has been found that it is particularly advantageous to premix and wet the aggregate and apply the aggregate by blowing it under pressure onto the surfaces of the pit, in a manner analogous to the "Gunnite" process of applying concrete in swimming pools. The aggregate is blown onto the wall at a predetermined pressure, ea, 2800 to 3600 pounds per square inch, and impacts the pit surface with a predetermined force em, in the range of about 900 to 1,000 pounds.

In addition to being quicker and requiring less labor, applying the aggregate in such a manner provides a number of advantages. The necessity of a separate compacting step is avoided; the compacting is more consistent, particularly on the vertical sidewalls; the depth and contour of the aggregate subgrade barrier is more readily controlled, and consistent, again, particularly on the vertical sidewalls of the pit; and the surface of subgrade barrier 14 also tends to be smoother, thus providing a more aesthetic appearance, while still being sufficiently rough to retain sand on the sidewalls. More significantly, the blowing process itself tends to mix the constituents of the aggregate, and in particular, fibers 28 and adhesive 30, providing desirable homogeneity. Moreover, where fibrillated fibers 28 are employed, a blowing process tends to open and spread the fibrils of fiber 28, creating spread net structures within the aggregate, increasing the load bearing strength of the final product, as well as the water distribution properties. The blowing process also tends to separate the material in mid-air so that the larger materials are deposited on the pit surface first, with the finer materials applied thereover. This causes the finer materials to settle between the coarser particles, filling interstices and binding the aggregate together.

Subgrade barrier 14, is particularly advantageous as compared to the prior art. It provides greater load bearing and shear strength, while, at the same time, being particularly elastic and flexible. In addition, fibers 28 provide particularly advantageous water distribution properties so that water absorbent adhesive 30 (e.g., psyllium) is quickly and efficiently activated, absorbing its capacity in water, and providing binding between the aggregate constituents. This permits the aggregate to be activated much more quickly and uniformly than would be expected. Additionally, it permits excess water to quickly percolate through the subgrade barrier 14 into the native earth. In addition, even if particles of subgrade barrier 14 are somehow broken off, and mixed with sand 16 they would tend to crumble once dried and, do not present large dangerous rock-like particles to contaminate the sand. Further, subgrade barrier 14 tends to retain sand 16 on the sidewalls, even in the face of normal usage, watering and the elements. Additionally, subgrade barrier 14 provides a clear and defined guide for the trimming of sod 18, thereby avoiding the creeping expansion of bunker peripheral contours.

The present invention is also particularly advantageous in any context where it is desirable to use a resilient surface with significant load bearing strength without using large gravel. It is also particularly advantageous for environments which require the surface to retains its consistency and resiliency over a wide range of weather conditions, and quickly recover consistency and resiliency after the range is exceeded. For example, it is desirable that athletic fields and courts tolerate relatively wet conditions, and recover quickly after, e a, a substantial rain or freeze thaw. The fibers provide for relatively fast distribution of water to the adhesive, and for speedy percolation of excess water through the surface. Thus, the surface is more quickly playable after a rainstorm or watering. Similarly, for the same reason, the surface is advantageous for use as recreational paths; the path is safer in that slippery conditions from standing water are quickly eliminated. The particle fiber size and relative amounts of the various sized components of the aggregate, adhesive and fiber would be varied to provide the desired performance characteristics of the particular surface. For example, in a baseball infield, it may be preferable to use relatively short fibers (e.g., preferably ⅛ inch or shorter) with an aggregate similar to that described above in connection with the golf bunker to provide a relatively tight, hard surface. In a turf football field, it may be preferable to use relatively long fiber (e.g. 1½ inch) in greater relative amounts (e.g., 4–12 pounds per ton) to provide greater shear strength, and for better drainage and to facilitate turf growth, less adhesive and more uniformly sized aggregate particles with less clay and silt. If desired, fertilizer may also be included. For example, aggregate meeting the USGA sand specification is preferred for turf fields. In other applications, e.g., golf cart paths, driveways, service roads, parking lots, and the like, that are designed to accommodate vehicular as well as foot traffic , the maximum size of the aggregate particles is preferably relatively large (e.g., ⅜ inch; approximately 2–15%, preferably 2–10%, and ideally, approximately 5–6% by volume). In such applications, fiber would suitably be in the range of ¼ to 2 inches in length, preferably in the range of ¾ to 1½ inch, and most preferably, approximately 1 inch. Other applications include use on slopes for erosion control, and landscape surfaces such as ground cover material for gardens, planting beds and highway medians.

It should be appreciated that the foregoing description is of preferred embodiments of the present invention contemplated by the inventors at the time of filing. Such embodiments, however, are merely exemplary. The invention is not limited to the specific components and ranges described. Modifications to the embodiments described above are contemplated, and may be made within the scope of the invention, as defined by the claims.

We claim:

1. A product for forming a stable resilient layer, the product comprising:

a particulate aggregate with particles of a plurality of sizes ranging downward from a selected maximum particle size, a selected amount of fiber strands having lengths within a selected range, and a selected amount of water-activated adhesive particles having a swell volume when absorbing water in a range of 25% to 45%.

in relative proportion such that when subjected to sufficient water the water-absorbent particles swell and bind the aggregate and fiber strands, forming a high shear strength flexible resilient layer.

2. The product of claim 1, including fiber strands in the amount of 0.05% to 1.0%, by dry weight.

3. The product of claim 2, including fiber strands in the amount of 0.1%, by dry weight.

4. The product of claim 2, including water-absorbent particles in the amount of 0.01% to 2.0%, by dry weight.

5. The product of claim 4, including water-absorbent particles in the amount of 0.5%, by dry weight.

6. The product of claim 5, including fiber strands in the amount of 0.1%, by dry weight.

7. The product of claim 1, including water-absorbent particles in the amount of 0.01% to 2.0%, by dry weight.

8. The product of claim 7, including water-absorbent particles in the amount of 0.1%, by dry weight.

9. The product of claim 1, wherein the water-absorbent particles comprise psyllium.

10. The product of claim 9, wherein the water-absorbent particles comprise psyllium having a swell volume in the range of 25% to 45%.

11. The product of claim 9, wherein the water-absorbent particles comprise psyllium having a swell volume of 35%.

12. The product of claim 8, wherein the water-absorbent particles comprise psyllium having a swell volume of 35%.

13. The product of claim 6, wherein the water-absorbent particles comprise psyllium having a swell volume of 35%.

14. The product of claim 1, wherein the fiber strands have lengths within the range of one-eight inch to three inches in length.

15. The product of claim 1, wherein the fiber strands have lengths within the range of one-eight inch to two inches in length.

16. The product of claim 1, wherein the fiber strands have lengths within the range of one-eight inch to one-half inches in length.

17. The product of claim 1, wherein the fiber strands are one quarter inch in length.

18. The product of claim 1, wherein the fiber strands are fibrillated.

19. The product of claim 1, wherein the fiber strands are fibrillated with a denier of at least 360.

20. The product of claim 15, wherein the fiber strands are fibrillated.

21. The product of claim 15, wherein the fiber strands are fibrillated with a denier of at least 360.

22. The product of claim 16, wherein the fiber strands are fibrillated with a denier of at least 360.

23. The product of claim 17, wherein the fiber strands are fibrillated with a denier of at least 360.

24. The product of claim 1, wherein the aggregate comprises a selected percentage of fine gravel/very coarse sand, a selected percentage of coarse sand; a selected percentage of silt and clay.

25. The product of claim 1, wherein the aggregate comprises a selected percentage of particles having a size of approximately 2 mm; a selected percentage of particles having a size of from about 0.5 to 2 mm; a selected percentage of particles having a size in the range of 0.05 to 0.5 mm and a selected percentage of particles from 0.0002 to 0.05 mm.

26. The product of claim 1, wherein the aggregate comprises 1–6% by volume of fine gravel/very coarse sand, 20%–50% of coarse sand; 20%–50% of fine sand; and 10%–40% of silt and clay.

27. The product of claim 1, wherein the aggregate comprises 1%–6% by volume of particles having a size of approximately 2 mm; 20%–50% of particles having a size of from about 0.5 to 2 mm; 20%–50% of particles having a size in the range of 0.05 to 0.5 mm; and 10%–40% of particles from 0.0002 to 0.05 mm.

28. The product of claim 1, wherein the aggregate comprises 1%–3% gravel; 30%–45% course sand; 25%–45% fine sand; and 15%–30% silt and clay.

29. The product of claim 1, wherein the aggregate comprises 1%–3% volume of particles having a size of approximately 2 mm; 30%–45% of particles having a size in the range of 0.05 to 0.5 mm; and 15%–30% of particles from 0.0002 to 0.05 mm.

30. The product of claim 1, wherein the aggregate comprises 1.3% gravel, 38.2% coarse sand, 36.3% fine sand, and 24.2% silt and clay.

31. The product of claim 1, wherein the aggregate comprises 1.3% by volume of particles having a size of approximately 2 mm; 38.2% of particles having a size of from about 0.5 to 2 mm; 36.3% of particles having a size in the range of 0.05 to 0.5 mm; and 24.2% of particles from 0.0002 to 0.05 mm.

32. For a golf sand bunker comprising a pit of selected contour and depth with a bottom surface and sidewalls, and sand disposed in the pit, a method of minimizing contamination of the sand, the method comprising:

forming a subgrade barrier on the bottom surface and sidewalls of the pit generally conforming to the selected contours, the barrier layer comprising a particulate aggregate with particles of a plurality of sizes ranging downward from a selected maximum particle size, a selected amount of fiber strands having lengths within a selected range, and a selected amount of water-absorbent particles that have a swell volume when absorbing water in a range of 25% to 45%, mixed in relative proportion such that when subjected to sufficient water, the water-absorbent particles swell and bind the aggregate and fiber strands.

33. The method of claim 32, wherein the barrier layer includes fiber strands in the amount of 0.05% to 1.0%, by dry weight.

34. The method of claim 33, wherein the barrier layer includes fiber strands in the amount of 0.1%, by dry weight.

35. The method of claim 33, wherein the barrier layer includes water-absorbent particles in the amount of 0.01% to 2.0%, by dry weight.

36. The method of claim 35, wherein the barrier layer includes water-absorbent particles in the amount of 0.5%, by dry weight.

37. The method of claim 36, wherein the barrier layer includes fiber strands in the amount of 0.1%, by dry weight.

38. The method of claim 32, wherein the barrier layer includes water-absorbent particles in the amount of 0.01% to 2.0%, by dry weight.

39. The method of claim 38, wherein the barrier layer includes water-absorbent particles in the amount of 0.1%, by the weight.

40. The method of claim 32, wherein the water-absorbent particles comprise psyllium.

41. The method of claim 40, wherein the water-absorbent particles comprise psyllium having a swell volume in the range of 25% to 45%.

42. The method of claim 40, wherein the water-absorbent particles comprise psyllium having a swell volume of 35%.

43. The method of claim 39, wherein the water-absorbent particles comprise psyllium having a swell volume of 35%.

44. The method of claim 37, wherein the water-absorbent particles comprise psyllium having a swell volume of 35%.

45. The method of claim 32, wherein the fiber strands have lengths within the range of one-eight inch to three inches in length.

46. The method of claim 32, wherein the fiber strands have lengths within the range of one-eight inch to two inches in length.

47. The method of claim 32, wherein the fiber strands have lengths within the range of one-eight inch to one-half inches in length.

48. The method of claim 32, wherein the fiber strands are one quarter inch in length.

49. The method of claim 32, wherein the fiber strands are fibrillated.

50. The method of claim 32, wherein the fiber strands are fibrillated with a denier of at least 360.

51. The method of claim 46, wherein the fiber strands are fibrillated.

52. The method of claim 46, wherein the fiber strands are fibrillated with a denier of at least 360.

53. The method of claim 47, wherein the fiber strands are fibrillated with a denier of at least 360.

54. The method of claim 48, wherein the fiber strands are fibrillated with a denier of at least 360.

55. The method of claim 32, wherein the step of forming a subgrade layer comprises:
mixing the particle aggregate with the fiber strands and water-absorbent particles;
adding water; and,
blowing the mixture, under selected pressure, onto the bottom surface and sidewalls of the pit.

56. The method of claim 55, wherein the predetermined pressure is in the range of 2800 to 3600 pounds per square inch.

57. The method of claim 55, wherein the barrier layer includes fiber strands in the amount of 0.05% to 1.0%, by dry weight.

58. The method of claim 55, wherein the barrier layer includes fiber strands in the amount of 0.1%, by dry weight.

59. The method of claim 55, wherein the barrier layer includes water-absorbent particles in the amount of 0.01% to 2.0%, by dry weight.

60. The method of claim 55, wherein the barrier layer includes water-absorbent particles in the amount of 0.5%, by dry weight.

61. The method of claim 55, wherein the water-absorbent particles comprises psyllium.

62. The method of claim 55, wherein the water-absorbent particles comprises psyllium having a swell volume in the range of 25% to 45%.

63. The method of claim 55, wherein the water-absorbent particles comprises psyllium having a swell volume of 35%.

64. The method of claim 55, wherein the fiber strands have lengths within the range of one-eight inch to two inches in length.

65. The method of claim 55, wherein the fiber strands have lengths within the range of one-eight inch to one-half inches in length.

66. The method of claim 55, wherein the fiber strands are one quarter inch in length.

67. The method of claim 55, wherein the fiber strands are fibrillated.

68. The method of claim 55, wherein the fiber strands are fibrillated with a denier of at least 360.

69. The method of claim 63, wherein the fiber strands are fibrillated with a denier of at least 360.

70. The method of claim 32, wherein the predetermined maximum particle size is 2 mm.

71. A golf sand bunker comprising:
a pit of selected contour and depth with a bottom surface and sidewalls, a subgrade barrier layer on the bottom surface and sidewalls of the pit generally conforming to the selected contours, the barrier layer comprising a particulate aggregate with particles of a plurality of sizes ranging downward from a selected maximum particle size, mixed with a selected amount of fiber strands having lengths within a selected range, and a selected amount of water-absorbent particles that have a swell volume when absorbing water in a range of 25% to 45%, mixed in relative proportion such that when subjected to sufficient water, the water-absorbent particles swell and bind the aggregate and fiber strands.

72. The bunker of claim 71, wherein the barrier layer includes fiber strands in the amount of 0.05% to 1.0%, by dry weight.

73. The bunker of claim 71, wherein the barrier layer includes fiber strands in the amount of 0.1%, by dry weight.

74. The bunker of claim 71, wherein the barrier layer includes water-absorbent particles in the amount of 0.01% to 2.0%, by dry weight.

75. The bunker of claim 71, wherein the barrier layer includes water-absorbent particles in the amount of 0.5%, by dry weight.

76. The bunker of claim 71, wherein the water-absorbent particles comprises psyllium.

77. The bunker of claim 71, wherein the water-absorbent particles comprises psyllium having a swell volume in the range of 25% to 45%.

78. The bunker of claim 71, wherein the water-absorbent particles comprises psyllium having a swell volume of 35%.

79. The bunker of claim 78, wherein the fiber strands are fibrillated with a denier of at least 360.

80. The bunker of claim 79, wherein the fiber strands have lengths within the range of one-eight inch to one-half inches in length.

81. The bunker of claim 71, wherein the fiber strands have lengths within the range of one-eight inch to three inches in length.

82. The bunker of claim 71, wherein the fiber strands have lengths within the range of one-eight inch to one-half inches in length.

83. The bunker of claim 71, wherein the fiber strands are one quarter inch in length.

84. The bunker of claim 71, wherein the fiber strands are fibrillated.

85. The bunker of claim 71, wherein the fiber strands are fibrillated with a denier of at least 360.

* * * * *